United States Patent
Lemme et al.

(10) Patent No.: US 10,467,607 B2
(45) Date of Patent: Nov. 5, 2019

(54) ELECTRONIC CARGO PAYMENT SYSTEM

(71) Applicant: PayCargo, LLC, Coral Gables, FL (US)

(72) Inventors: Sergio Lemme, Coral Gables, FL (US); Eugenio Crespo, Coral Gables, FL (US); Juan Dieppa, Coral Gables, FL (US)

(73) Assignee: PayCargo, LLC, Coral Gables, FL (US)

( * ) Notice: Subject to any disclaimer, the term of this patent is extended or adjusted under 35 U.S.C. 154(b) by 740 days.

(21) Appl. No.: 14/462,236

(22) Filed: Aug. 18, 2014

(65) Prior Publication Data

US 2015/0026048 A1   Jan. 22, 2015

Related U.S. Application Data

(63) Continuation of application No. 12/685,908, filed on Jan. 12, 2010, now Pat. No. 8,812,381.

(Continued)

(51) Int. Cl.
*G06Q 30/04* (2012.01)
*G06Q 20/14* (2012.01)
(Continued)

(52) U.S. Cl.
CPC .............. *G06Q 20/14* (2013.01); *G06Q 10/08* (2013.01); *G06Q 20/102* (2013.01); *G06Q 20/40* (2013.01);
(Continued)

(58) Field of Classification Search
CPC ......... G06Q 30/04; G06Q 40/10; G06Q 40/12
(Continued)

(56) References Cited

U.S. PATENT DOCUMENTS 7,312,702 B1 * 12/2007 Willms .................. G06Q 10/08
                                              340/540
8,812,381 B2    8/2014 Lemme et al.
(Continued)

FOREIGN PATENT DOCUMENTS

| JP | 2002-120912 A | 4/2002 |
|---|---|---|
| KR | 10-2003-0012288 A | 2/2003 |
| KR | 10-2006-0091821 A | 8/2006 |

OTHER PUBLICATIONS

International Preliminary Report on Patentability for PCT/US2010/020899 dated Jul. 19, 2011, 6 pages.
(Continued)

*Primary Examiner* — Florian M Zeender
*Assistant Examiner* — Christopher R Buchanan
(74) *Attorney, Agent, or Firm* — Kilpatrick Townsend & Stockton LLP

(57) ABSTRACT

Embodiments of the disclosure generally relate to an electronic cargo payment system and methods for electronically and automatically processing electronic payments for goods shipped by carriers for shippers. In embodiments, the accounts receivable system of the carrier transfers one or more invoices to a central payment system. The central payment system stores and organizes the invoices. A shipper communicates with the central payment system to view invoices related to that shipper. Upon approval of the invoice, the central payment system can automatically pay the invoice for the shipper and to the carrier.

21 Claims, 14 Drawing Sheets

Related U.S. Application Data

(60) Provisional application No. 61/145,449, filed on Jan. 16, 2009.

(51) Int. Cl.
*G06Q 40/00* (2012.01)
*G06Q 10/08* (2012.01)
*G06Q 20/10* (2012.01)
*G06Q 20/40* (2012.01)

(52) U.S. Cl.
CPC ............. *G06Q 30/04* (2013.01); *G06Q 40/10* (2013.01); *G06Q 40/12* (2013.12)

(58) Field of Classification Search
USPC ..................................................... 705/34, 30
See application file for complete search history.

(56) References Cited

U.S. PATENT DOCUMENTS

| | | | |
|---|---|---|---|
| 2002/0077847 A1* | 6/2002 | Thiel ....................... | G06Q 10/08 705/39 |
| 2004/0068426 A1* | 4/2004 | Liu .................. | G06Q 10/06311 705/7.21 |
| 2004/0215480 A1* | 10/2004 | Kadaba .................... | B07C 3/00 705/338 |
| 2005/0033671 A1 | 2/2005 | Hahn-Carlson | |
| 2005/0222853 A1* | 10/2005 | Black ..................... | G06Q 10/08 705/331 |
| 2006/0074791 A1* | 4/2006 | Jelaco ................... | G06Q 10/08 705/37 |
| 2008/0126218 A1* | 5/2008 | Alvarado ............. | G06Q 10/083 705/330 |
| 2009/0265274 A1* | 10/2009 | Hahn-Carlson ........ | G06Q 20/10 705/44 |
| 2010/0179896 A1 | 7/2010 | Black et al. | |
| 2010/0223173 A1 | 9/2010 | Kadaba | |
| 2010/0312627 A1* | 12/2010 | Khechef ................ | G06Q 20/10 705/14.17 |
| 2011/0099121 A1* | 4/2011 | Holley ................... | G06Q 10/08 705/333 |

OTHER PUBLICATIONS

International Search Report and Written Opinion dated Jul. 28, 2010 for PCT/US2010/020899 filed on Jan. 13, 2010, 8 pages.

\* cited by examiner

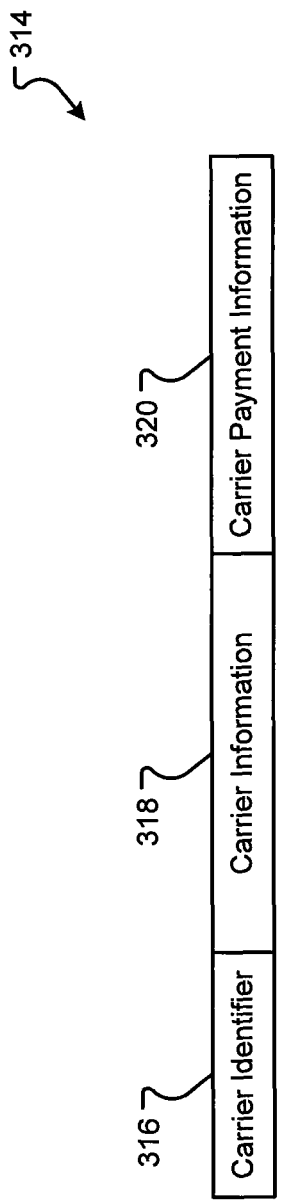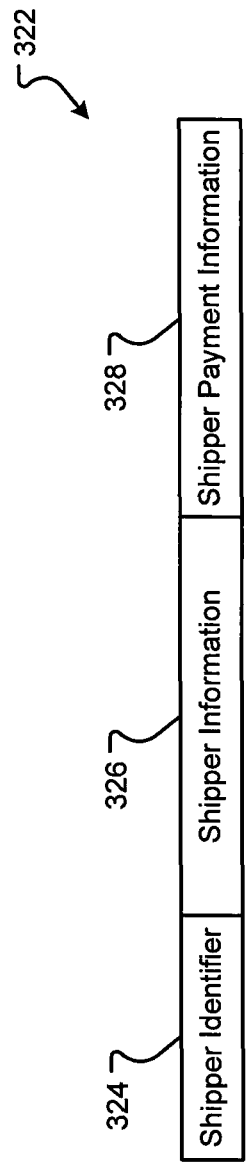
Fig. 3B
Fig. 3C

US 10,467,607 B2

ELECTRONIC CARGO PAYMENT SYSTEM

PRIORITY CLAIM

This application is a continuation application of U.S. patent application Ser. No. 12/685,908, filed on Jan. 12, 2010, which is a non-provisional application of 61/145,449, filed Jan. 16, 2009, the complete disclosure of which is herein incorporated by reference.

BACKGROUND OF THE INVENTION

International trade requires the shipment of goods and services between various ports located in numerous countries. Generally, a shipper hires a carrier to move goods from one location to another. A shipper can be an importer buying goods from a manufacturer or distributer in another location. A shipper may also be an exporter shipping goods as a distributor or manufacturer to a buyer in another location. The carrier is generally the entity that owns and/or operates the equipment used to ship the goods. For example, the carrier may be a company that operates cargo ships that transport shipping containers over the oceans.

To pay for the cost of the shipment, a carrier will generally send a paper invoice to the shipper. The shipper reviews the invoice and can remit payment by check, money order, or bank transfer. These payment options are generally slow and cost additional money for couriers, mail, etc. If the shipper disputes some item in the invoice, the shipper may send the carrier a letter disputing the amount in the invoice. The resolution process is slow and expensive as the carrier and shipper send letters between the parties to come to a resolution.

It is in view of these and other considerations not mentioned herein that the embodiments of the present disclosure were envisioned.

BRIEF SUMMARY OF THE INVENTION

Embodiments of the disclosure generally relate to an electronic cargo payment system and methods for electronically and automatically processing electronic payments for goods shipped by carriers for shippers. In embodiments, the accounts receivable system of the carrier transfers one or more invoices to a central payment system. The central payment system stores and organizes the invoices. A shipper communicates with the central payment system to view invoices related to that shipper. Upon approval of the invoice, the central payment system can automatically pay the invoice for the shipper and to the carrier.

BRIEF DESCRIPTION OF THE DRAWINGS

The present disclosure is described in conjunction with the appended figures:

FIGS. 3A-C are block diagrams of embodiments of one or more data structures for communicating and storing invoice, carrier, and shipper information;

DETAILED DESCRIPTION OF THE INVENTION

Figure 1:
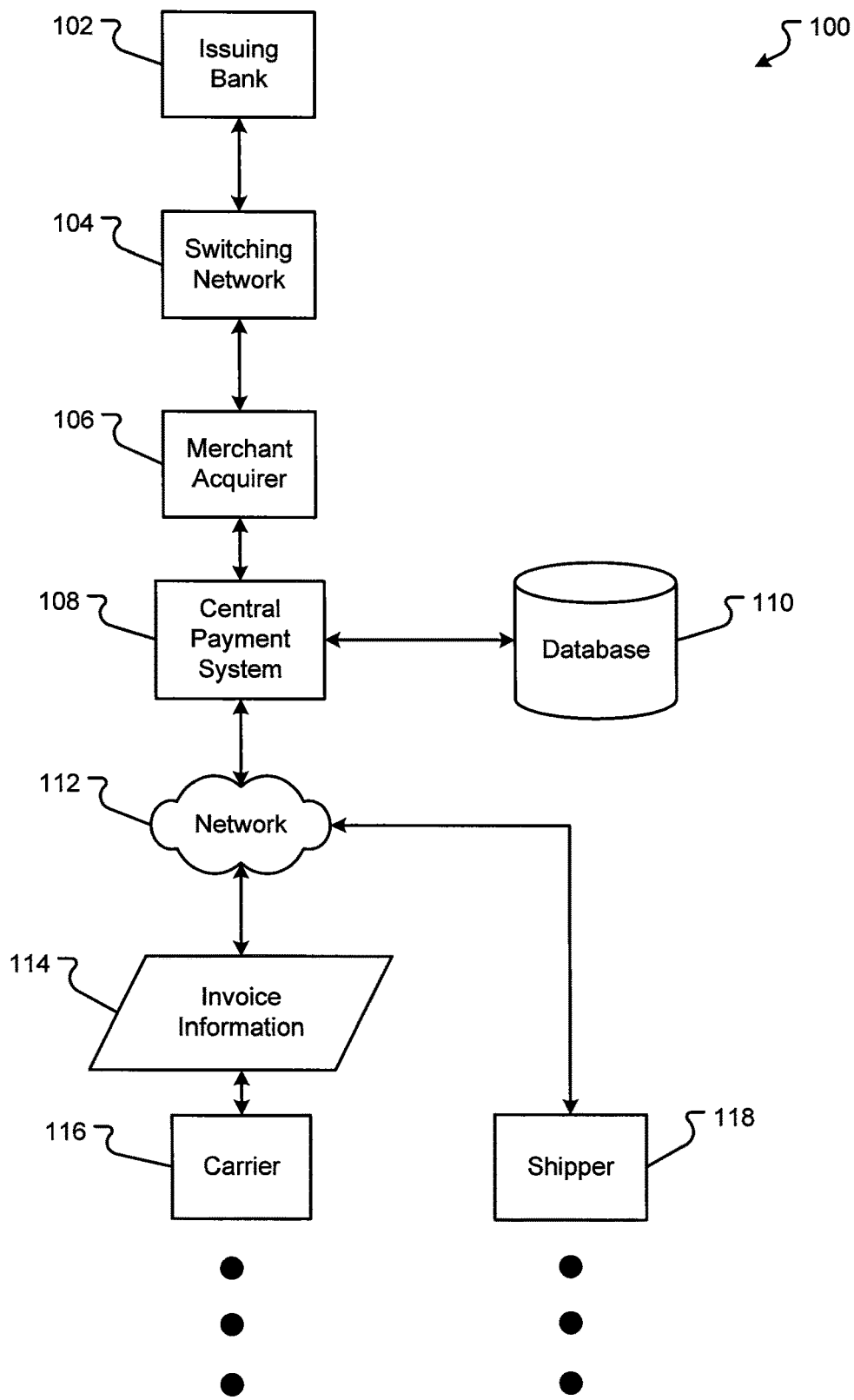
FIG. 1 is a block diagram of an embodiment of a system operable to electronically and automatically pay for cargo shipments.

Embodiments described herein provide for an electronic cargo payment system. The electronic cargo payment system includes a central payment system that can communicate with two or more carriers (e.g., Crowley Maritime Corporation) and two or more shippers (e.g., Walmart). The central payment system allows the carriers and shippers to register with the central payment system to effectuate the payment of cargo shipments. After registration, the carrier can upload one or more invoices to the central payment system. The invoices may be for different shippers or may be for the same shipper. After uploading the invoices, the central payment system organizes and stores the invoice information to allow for access by the shipper. The shipper may be informed about the available invoices and communicate with the central payment system. In reviewing the invoices, the shipper can approve the invoice. In response to the approval, the central payment system can automatically pay the invoice for the shipper.

For example, Walmart can contract with Crowley to ship 10 tons of bananas from Puerto Rico. After or during shipment, Crowley generates an invoice from Crowley's accounts receivable system and sends the invoice for the shipment to the central payment system. The invoice identifies Walmart as the shipper and Crowley as the carrier. The invoice also includes the itemized charges and an amount to be paid by Walmart. The invoice information can be stored in the central payment system. The central payment system may then alert Walmart to the reception of the invoice. For example, an email may be sent to Walmart's accounting department. The alert may not be needed as Walmart may interface with the central payment system periodically and regularly. Walmart communicates with the central payment system to view the invoice information. For example, Walmart logs on to a website provided by the central payment system and can view invoices in a webpage. Walmart can approve the invoices. Upon approval, the central payment system can request an ACH transfer from an account associated with Walmart to an intermediary account. Then, the central payment system can make an ACH transfer from the intermediary account to an account associated with Crowley. In this way, all approvals and payments are electronic. Further, payments are automatic between the parties upon approval of the invoice.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Two or more components described herein may be in communication. To be in communication includes any form of electrical or electronic connection, either wired or wireless, allowing two components to exchange signals, data, information, etc. The communications may be made using any protocol or format including one of, but not limited to, TCP/IP, 802.11(b), Electronic Data Interchange For Accounting (EDIFACT), Web services, etc. The hardware and/or software used in a communication interface allows for the communication between components. The hardware and/or software can include transceivers, MODEMs, or other types of network interface equipment.

An embodiment of an electronic cargo payment system 100 for providing electronic payment for a cargo shipment is shown in FIG. 1. The electronic cargo payment system 100 can include a central payment system 108 in communication with a carrier 116 and a shipper 118. In embodiments, the central payment system 108 is in communication with two or more carriers 116 and two or more shippers 118. The central payment system 108 can communicate with the carrier 116 and/or shipper 118 over a network 112. The network may be a private or public network. In embodiments, the network 112 is the Internet.

The central payment system 108 is a computing system or device (as described in conjunction with FIG. 7) that interacts with the carrier 116 and/or the shipper 118. The central payment system 108 is a software and/or hardware system to electronically receive invoices, electronically approve the invoices, and automatically pay the invoices. The central payment system 108 can be a system associated with the carrier 116 or shipper 118. However, the central payment system 108 can be a separate system not associated with either the carrier 116 or the shipper 118.

In embodiments, the central payment system 108 registers the carrier 116 and/or the shipper 118 and stores the registration information in a database 110. The database 110 can include any hardware and/or software to logically store information received from or provided to the carrier 116, the shipper 118, or a merchant acquirer 106. For example, the database 110 is a relational database, such as Microsoft Access, stored across an array of memory devices. the database 110 can include a computing system (as described in conjunction with FIG. 7) for storing and accessing the memory storing the data.

In embodiments, the central payment system 108 is also in communication with a merchant acquirer 106. The merchant acquirer 106 may use a second communications channel that is proprietary or restricted to allow the central payment system 108 to communicate with a merchant acquirer 106 privately and securely. The second communications channel may be a cellular network, a wireless LAN or WAN, or other communication system.

The merchant acquirer 106, in embodiments, is an entity that processes credit or debit authorizations. For example, the merchant acquirer 106 is VISA® or MASTERCARD®. In other embodiments, the merchant acquirer 106 is a financial institution, for example, a bank, that processes credit or debit authorizations and/or approves debits or credits to a consumer's financial account. The merchant acquirer 106 may have a predefined relationship with the central payment system 108. In embodiments, a merchant acquirer 106 receives an authorization request and passes the request to a consumer payment issuing institution 102 (simply referred to as the issuing bank 102). The issuing bank 102, in embodiments, is a financial institution that approves transactions for a consumer.

In operation, the central payment system 108 receives invoice information 114 from the carrier 116 over the network 112. The central payment system 108 analyzes the invoice information 114 and stores the information in the database 110. The shipper 118 may then communicate with the central payment system 108. In an embodiment, the shipper 118 is informed of the new invoice by email or other communication to the shipper 118. The shipper 118 logs on to a website provided by the central payment system 108. The logon allows the central payment system 108 to determine the identity of the shipper 118. The invoices related to the shipper 118 are identified with the logon name or an identifier related to the shipper 118. The invoices are presented to the shipper 118 on the website.

The shipper 118 can then review the invoice(s) and approve the invoices for payment. If the shipper 118 approves the invoice, the central payment system 108 can retrieve payment information related to the shipper 118 from the database 110. For example, the central payment system 108 retrieves the bank account number, routing number, and other information required for an ACH payment. Then, the central payment system 108 can send a transfer request over an ACH network to transfer the amount of the invoice from the shipper's account to an intermediary account associated with the central payment system 108.

The merchant acquirer 106 receives the payment information from the central payment system 108. In embodiments, the merchant acquirer 106 may then approve the transaction by determining the consumer can pay for the transaction and then issues an authorization. The payment information is sent on to the issuing bank 102, which authorizes the transaction, over a switching network 104 (e.g., the ACH network). In embodiments, the merchant acquirer 106 further sends the authorization to the central payment system 108. The central payment system 108 can then forward the authorization to the shipper 118 and/or carrier 116. In other embodiments, the issuing bank 102 approves the transaction. If approved, the issuing bank 102 can transfer the funds for the invoice to the intermediary account of the central payment system 108.

Upon receiving payment into the intermediary account, the central payment system 108 can retrieve payment information related to the carrier 116 from the database 110. For example, the central payment system 108 retrieves the bank account number, routing number, and other information required for an ACH transfer to the carrier 116. Then, the central payment system 108 can send a transfer request over an ACH network to transfer the amount of the invoice to the carrier's account from the intermediary account associated with the central payment system 108.

The merchant acquirer 106 receives the payment information from the central payment system 108. In embodiments, the merchant acquirer 106 may then approve the transaction by determining that the money in the intermediary account is sufficient to pay for the transaction and then issues an authorization. The payment information is sent on to the issuing bank 102, which authorizes the transaction, over a switching network 104 (e.g., the ACH network). In embodiments, the merchant acquirer 106 further sends the authorization to the central payment system 108. The central payment system 108 can then forward the authorization to the shipper 118 and/or carrier 116. In other embodiments, the issuing bank 102 approves the transaction. If approved, the issuing bank 102 can receive the funds for the invoice from the intermediary account of the central payment system 108.

Other payment methods are also possible including credit payments, debit transactions, etc. Regardless, upon approval of an invoice, the central payment system 108 can affect an automatic payment between the shipper 118 and carrier 116. If the invoice is not approved, the central payment system 108 can provide a dispute resolution system (not shown) to negotiate the problems with the invoice.

Figure 2:
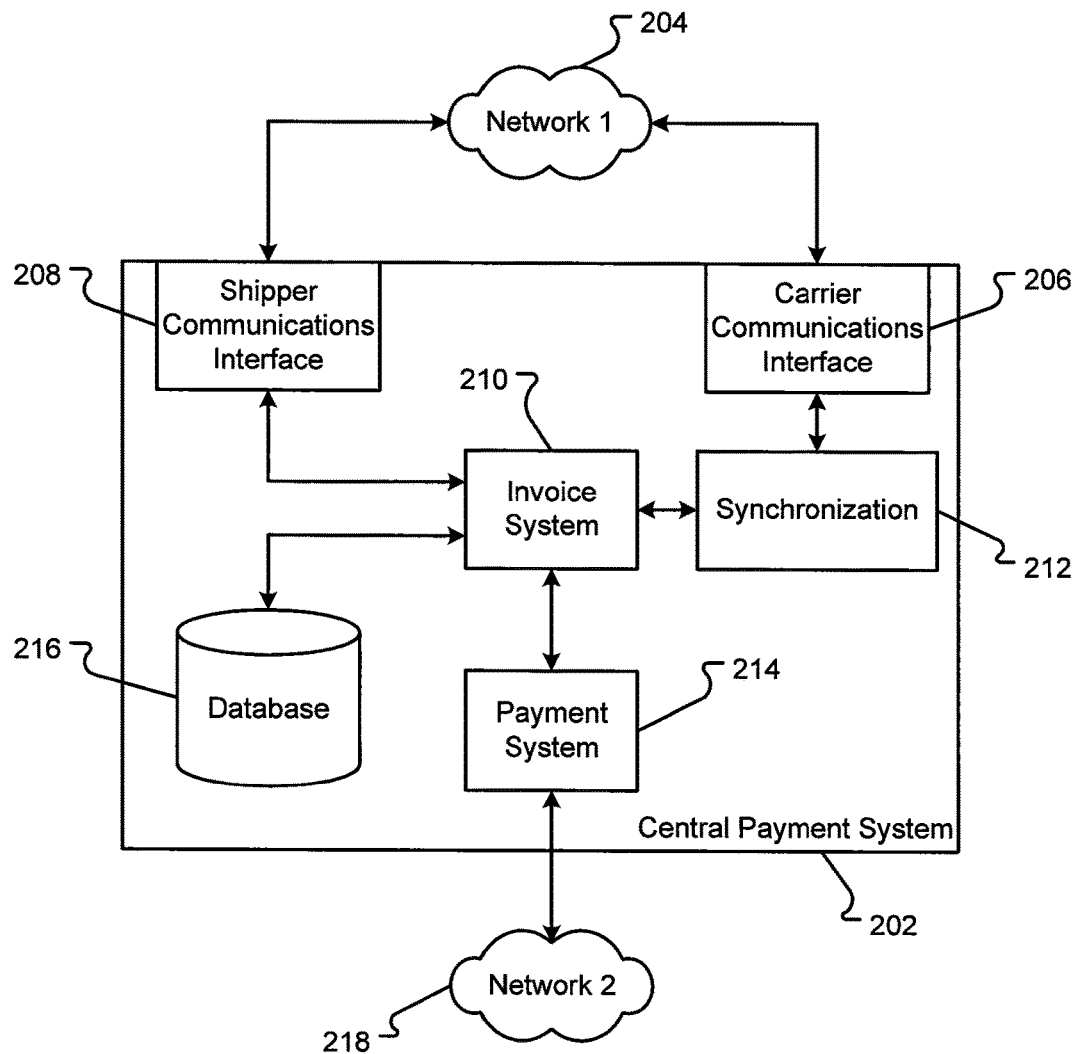
FIG. 2 is a hardware and/or software block diagram of an embodiment of central payment system operable to electronically and automatically pay for cargo shipments.

An embodiment of a central payment system 202 is shown in FIG. 2. The central payment system 202 may be the same or similar to central payment system 108 (FIG. 1). The central payment system 202 can include software components or modules executed in a processor or hardware circuits formed in an application-specific integrated circuit, field-programmable gate array, or other hardware device. In embodiments, the central payment system 202 includes a shipper communications interface 208, a carrier communication interface 206, a synchronization component 212, an invoice system 210, and a payment system 214.

The shipper communications interface 208 and/or carrier communication interface 206 provides communications between the shipper 118 (FIG. 1) and/or carrier 116 (FIG. 1), respectively, via network 1 204. Network 1 204 may be the same or similar to network 112 (FIG. 1). The communications may be any format or by any protocol. In an embodiment, the shipper communications interface 208 and/or carrier communication interface 206 provide a web interface allowing a shipper 118 (FIG. 1) or carrier 116 (FIG. 1) to interact with the central payment system 202 through one or more web pages. The web pages may be generated by the shipper communications interface 208 or carrier communication interface 206 and sent to and rendered by the shipper 118 (FIG. 1) or carrier 116 (FIG. 1). Thus, the shipper communications interface 208 and/or carrier communication interface 206 can include a web server or other system for providing web pages. The shipper communications interface 208 and/or carrier communication interface 206 may also be able to receive inputs into the web pages via a message sent to the shipper communications interface 208 or carrier communication interface 206.

The carrier communication interface 206 may include a translator. In embodiments, the carrier 116 (FIG. 1) sends invoice information 114 (FIG. 1) in a proprietary format from the accounts receivable system of the carrier 116 (FIG. 1). The translator may translate the information from the proprietary format to a common format. For example, the translator may translate the information into an XML document having standard fields with information input from the invoice information 114 (FIG. 1) into the standard fields. There may be a translator for each carrier 116 (FIG. 1). In other embodiments, the translation is completed by each carrier 116 (FIG. 1). Thus, each carrier 116 (FIG. 1) sends a standard format document to the central payment system 202.

The synchronization component 212 can allow for synchronization of invoice information between the carrier 116 (FIG. 1) and the central payment system 202. In embodiments, each carrier 116 (FIG. 1) may transfer invoice information 114 (FIG. 1) either in a batch or as separate invoices. A batch is two or more invoices that may be associated with one or more shippers 118 (FIG. 1). The carrier 116 (FIG. 1) can determine a time to batch and transfer invoices. Thus, the transfer of invoice information may occur periodically, for example, every day at midnight.

This batched transfer can include the synchronization of information between the central payment system 202 and the carriers accounts receivable system 116 (FIG. 1). Thus, any changes, either in the central payment system 202 or the carrier 116 (FIG. 1), can be reflected in the other system. The synchronization component 212 component completes the synchronization by checking for invoice information that has changed since the last synchronization. For example, when an invoice is changed, either the central payment system 202 or the carrier 116 (FIG. 1) can mark and time stamp the change. The synchronization component 212 searches for and identifies files marks as changed. The time stamps can be compared to the date and time of the last synchronization. If the time stamp is more recent (e.g., is later in time than the synchronization date and time), the change can be sent to the carrier 116 (FIG. 1). The carrier 116 (FIG. 1) may conduct a similar procedure to send changes to the central payment system 202. In alternative embodiments, the entire invoice may be resent rather than just the changes.

The invoice system 210 can provide the information for the web pages or communications to and from the shipper 118 (FIG. 1) and/or carrier 116 (FIG. 1). Further, the invoice system 210 may receive the inputs from the shipper 118 (FIG. 1) and/or carrier 116 (FIG. 1) to approve invoices and automatically pay the invoices. The invoice system 210 can receive the invoice information from the synchronization component 212 and store the information in the database 216. The database 216 may be the same or similar to the database 110 (FIG. 1). Periodically or upon request, the invoice system 210 can receive a request from the shipper 118 (FIG. 1) to view invoice information associated with the shipper 118 (FIG. 1). The invoice system 210 may then determine an identifier for the shipper 118 (FIG. 1) and retrieve, from the database 216, invoice information associated with the shipper identifiers. This information can be provided to the shipper 118 (FIG. 1) in a web page. The invoice system 210 may then receive any approval for an invoice. Upon receiving the approval, the invoice system 210 can instruct the payment system 214 to pay the invoice.

In embodiments, the payment system 214 communicates with the merchant acquirer 106 (FIG. 1) or other entity over network 2 218. Network 2 218 may be a private network (e.g., the ACH network) or other network used to communicate payment information. The payment system 214 can format payment requests and transmit the payment requests based on information sent to the payment system 214 from the invoice system 210. The payment system 214 may also receive authorizations for payment, payment completion messages, etc. that are reported to the shipper 118 (FIG. 1) or carrier 116 (FIG. 1). In embodiments, the received messages are ACH messages notifying the shipper 118 (FIG. 1) or carrier 116 (FIG. 1) that an ACH payment has been completed.

Figure 3A:
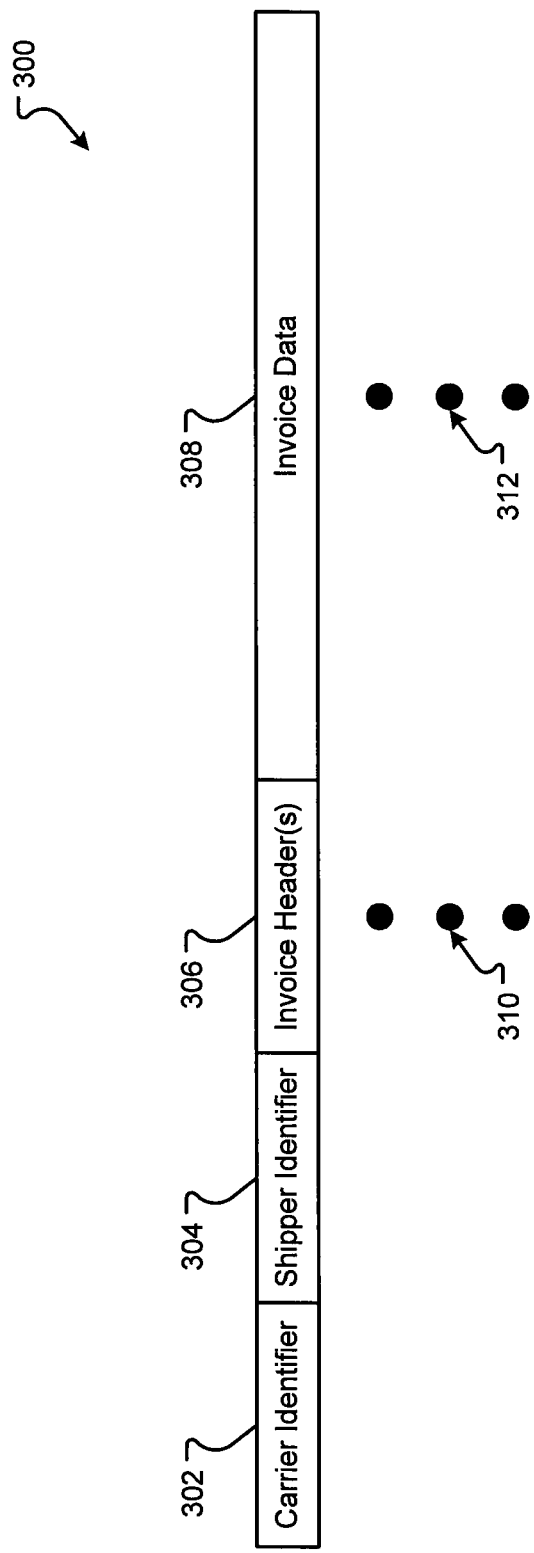

Embodiments of data structures used for communication of information to or from the central payment system 108 (FIG. 1) and/or for storage in the database 110 (FIG. 1) are shown in FIGS. 3A-3C. An embodiment of a data structure 300 to communicate or store invoice data is shown in FIG. 3A. The invoice data structure 300 can include one or more fields that contain information that directs a processor or other hardware component in the central payment system 202 (FIG. 2) to completed predetermined functions. The invoice data structure 300 can include a carrier identifier field 302, a shipper identifier field 304, an invoice header 306, and/or invoice data 308.

A carrier identifier 302 can be any identifier associated with the carrier 116 (FIG. 1).

For example, the carrier identifier 302 is a unique alphanumeric identifier assigned to the carrier 116 (FIG. 1) when the carrier 116 (FIG. 1) registers with the central payment system 108 (FIG. 1). In other embodiments, the carrier identifier 302 is a numeric, a GUI, a logon name chosen by the carrier 116 (FIG. 1), or other identifier. The carrier identifier 302 can be any type of identifier if the identifier is unique from other carrier identifiers 302 associated with carriers 116 (FIG. 1). Likewise, the shipper identifier 304 can be any identifier associated with the shipper 118 (FIG. 1). For example, the shipper identifier 304 is a unique alphanumeric identifier assigned to the shipper 118 (FIG. 1) when the shipper 118 (FIG. 1) registers with the central payment system 108 (FIG. 1). In other embodiments, the shipper identifier 304 is a numeric, a GUI, a logon name chosen by the shipper 118 (FIG. 1), or other identifier. As with the carrier identifier 302, the shipper identifier 304 can be any type of identifier if the identifier is unique from other shipper identifiers 304 associated with other shippers 118 (FIG. 1).

The invoice header field 306 can include any identifying information associated with a particular invoice. It is possible to have two or more invoices associated with each pair of shipper 118 (FIG. 1) and carrier 116 (FIG. 1), as represented by ellipses 310 and 312. The information in the invoice header 306 can differentiate a first invoice from a second invoice that are both associated with both the carrier 116 (FIG. 1) and shipper 118 (FIG. 1). Further, if there is only one invoice associated with the carrier 116 (FIG. 1) and shipper 118 (FIG. 1), the invoice header field 306 may be eliminated. In embodiments, the invoice header field 306 can include one or more of, but is not limited to, a unique identifier for the invoice (e.g., invoice number), a date of the invoice, a time of the invoice, a name for the invoice, etc.

Each invoice can include information about the invoice, which is included in an invoice data field 308. The invoice data 308 can include one or more of, but is not limited to, the price of the invoice, the items in the cargo (e.g., the bill of lading), the date of delivery, the date of shipment, the weight of the cargo, the volume of the cargo, etc. The items in the invoice may each be identified by an identifier. The item identifier may be standard for each item across all invoices. As such, the central payment system 202 can organize and store the data in a standard format. Further, the item identifiers can allow disputes to be directed on an item by item basis.

A carrier registration data structure 314 is shown in FIG. 3B. The carrier registration data structure 314 can include a carrier identifier field 316, a carrier information field 318, and/or a carrier payment information field 320. The carrier identifier field 316 can include the unique carrier identifier associated with the carrier. This identifier may be assigned to the carrier by the central payment system 202 upon registration of the carrier. In other embodiments, the carrier may choose the identifier. The carrier information field 318 can include biographical information for the carrier, including one or more of, but not limited to, the carrier's address, phone number, zip code, name, logo, hours of operation, etc. The carrier payment information 320 provides information necessary to allow the central payment system 202 to make automatic payments to the carrier. The carrier payment information 320 can include one or more of, but is not limited to, the carrier's bank account number, the routing number of the carrier's bank, the carrier's credit account number, the carrier's debit account number, indication of whether the carrier provides credit, etc.

A shipper registration data structure 322 is shown in FIG. 3C. Similar to the carrier registration data structure 314, the shipper registration data structure 322 can include a shipper identifier field 324, a shipper information field 326, and/or a shipper payment information field 328. The shipper identifier field 324 can include the unique shipper identifier associated with the shipper. This identifier may be assigned to the shipper by the central payment system 202 upon registration of the shipper. In other embodiments, the shipper may choose the identifier. The shipper information field 326 can include biographical information for the shipper, including one or more of, but not limited to, the shipper's address, phone number, zip code, name, logo, hours of operation, etc. The shipper payment information 328 provides information necessary to allow the central payment system 202 to make automatic payments for the shipper. The shipper payment information 320 can include one or more of, but is not limited to, the shipper's bank account number, the routing number of the shipper's bank, the shippers credit account number, the shipper's debit account number, indication of whether the shipper is provided credit by a carrier, etc.

Figure 4:
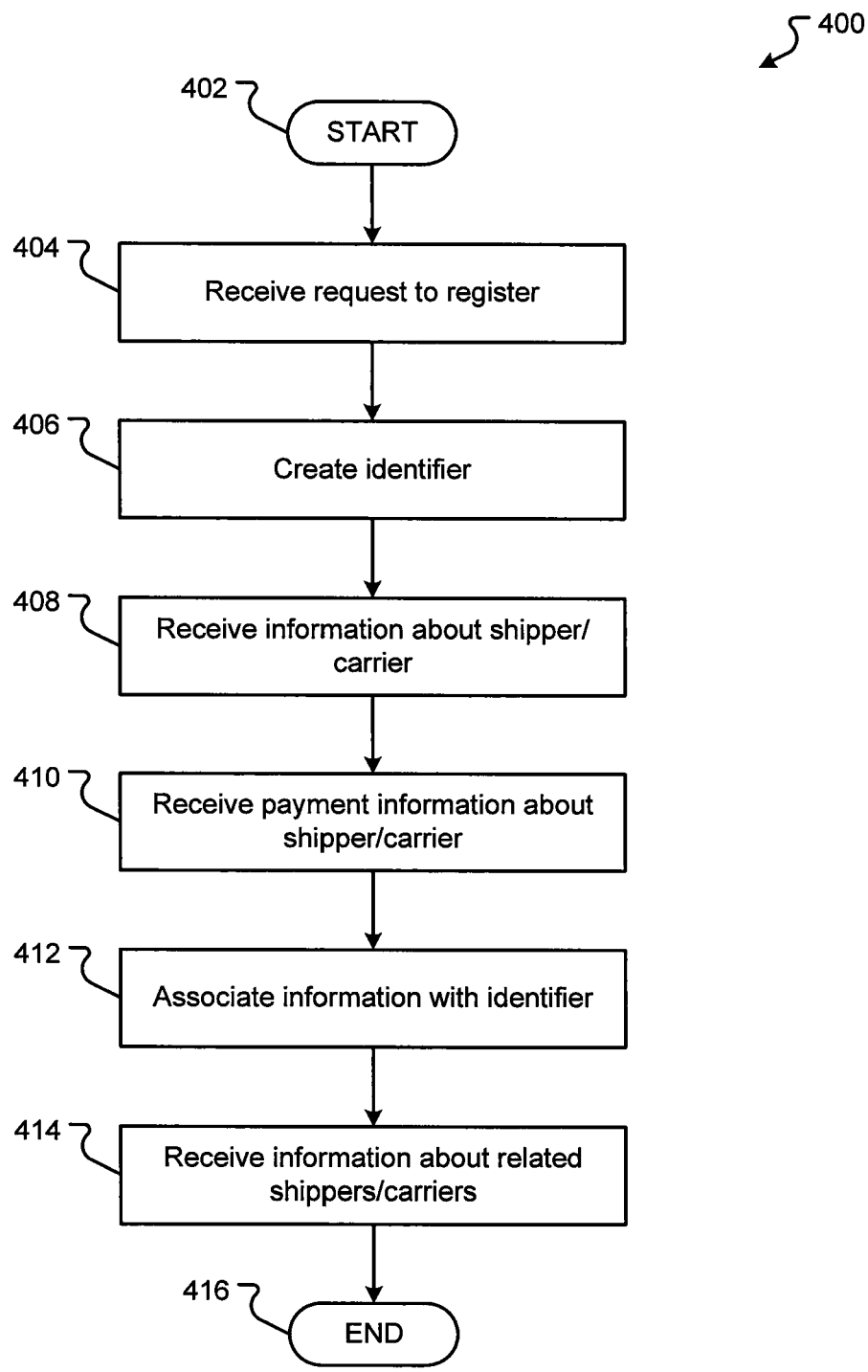
FIG. 4 is a flow diagram of an embodiment of a process for registering shippers or carriers with the central payment system.

An embodiment of a method 400 for registering a carrier or shipper is shown in FIG. 4. The method 400 may represent one or more steps of a computer-executable process that is executed by a processor. In embodiments, the method 400 will be explained with reference to components and data structures described in conjunction with FIGS. 1-3C. Generally, the method 400 begins with a start operation 402 and terminates with an end operation 416. However, the steps shown in FIG. 4 may represent only a subset of steps in the method 400, and the steps shown may be preformed out of order.

The central payment system 202 receives a request from a shipper 116 or a carrier 114 to register in step 404. The request can be the selection of a user interface device (e.g., selectable button) on a web page for the central payment system 202. The request is received as a TCP/IP packet at the central payment system 202. The central payment system 202 creates an identifier in step 406. The central payment system 202 can create the carrier registration data structure 314 or the shipper registration data structure 322 in the database 216. The identifier can be generated and stored in the carrier identifier field 316 or the shipper identifier field 324. The identifier may be randomly generated and checked against existing identifiers in the database 216. For example, after creating the identifier, the central payment system 202 conducts a query on the database 216 for the created identifier. If no result is returned from the database, the identifier is associated with the carrier or shipper and stored in the database 216. However, if a result is returned, a new identifier is created and checked. This process may continue until an unique identifier is created. In other embodiments, the identifiers are sequential, and the next sequential identifier is assigned to the carrier or shipper.

The central payment system 202 may receive information about the shipper or carrier in step 408. In response to receiving the request to register and/or the creation of the identifier, the central payment system 202 may send, via the shipper communications interface 208 or the carrier communication interface 206, a web page requesting information. The information can be general information about the shipper or carrier. The response from the shipper or carrier (e.g., entries into the web page) may be a TCP/IP message. The information can be received in or stored in either the carrier information field 318 or the shipper information field 326.

The central payment system 202 may then receive payment information about the shipper or carrier in step 410. In response to receiving the request to register and/or the creation of the identifier and/or the receipt of information in step 408, the central payment system 202 may send, via the shipper communications interface 208 or the carrier communication interface 206, a web page requesting payment information. The shipper communications interface 208 or the carrier communication interface 206 may establish a secure connection to protect the payment information. The information can be payment information for the shipper or carrier. The response from the shipper or carrier (e.g., entries into the web page) may be a TCP/IP message. The payment information can be received in or stored in either the carrier payment information field 320 or the shipper payment information field 328.

The central payment system 202 associates the information (payment or otherwise) with the identifier in step 412. In embodiments, the central payment system 202 associates the information with the identifier by storing the information in the carrier registration data structure 314 or the shipper registration data structure 322, in the database 216, having the associated identifier. In other embodiments, the information is stored separately and a link or association between the identifier and the information is created in the database 216.

In embodiments, the central payment system 202 allows a shipper to associate the shipper with carrier(s) and allows a carrier to associate the carrier with shipper(s) in step 414. For example, a shipper can review the carriers registered with the central payment system 202. The shipper can select one or more carriers that the shipper uses. The identifier for the shipper is then associated with the identifier for the carrier. The associations may be stored in the shipper information 326. The associations allow the shipper control over which carriers it will allow to use the central payment system 202 for invoice presentment and payment. The central payment system 202 can also allow the carrier to associate with shippers in a similar manner.

Figure 5:
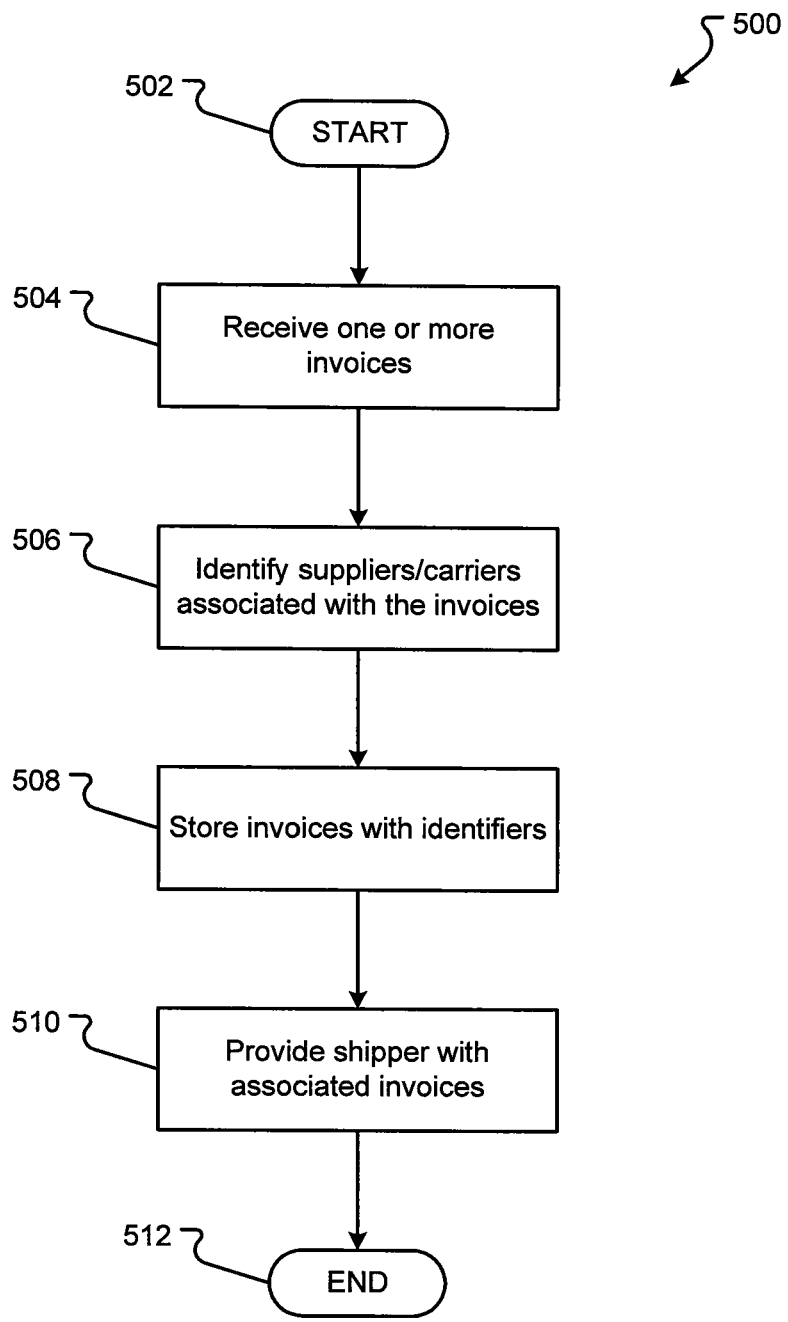
FIGS. 5 are flow diagrams of an embodiment of a process for receiving invoice information from the carrier.

An embodiment of a method 500 for receiving invoice information from a carrier is shown in FIG. 5. The method 500 may represent one or more steps of a computer-executable process that is executed by a processor. In embodiments, the method 500 will be explained with reference to components and data structures described in conjunction with FIGS. 1-3C. Generally, the method 500 begins with a start operation 502 and terminates with an end operation 512. However, the steps shown in FIG. 5 may represent only a subset of steps in the method 500, and the steps shown may be performed out of order.

The central payment system 202 receives one or more invoices from a carrier 116 in step 504. In embodiments, the carrier 116 sends invoice information 114 to the carrier communication interface 206. The invoice information 114 may be received as part of a synchronization process executed by the synchronization component 212. The invoice information 114 may represent one or more invoices. Invoice information 114 may be provided in an invoice data structure as described in conjunction with FIG. 3A. The central payment system 202 may then identify the shipper 118 and/or the carrier 116 associated with the invoice(s) in step 506.

Figure 6:
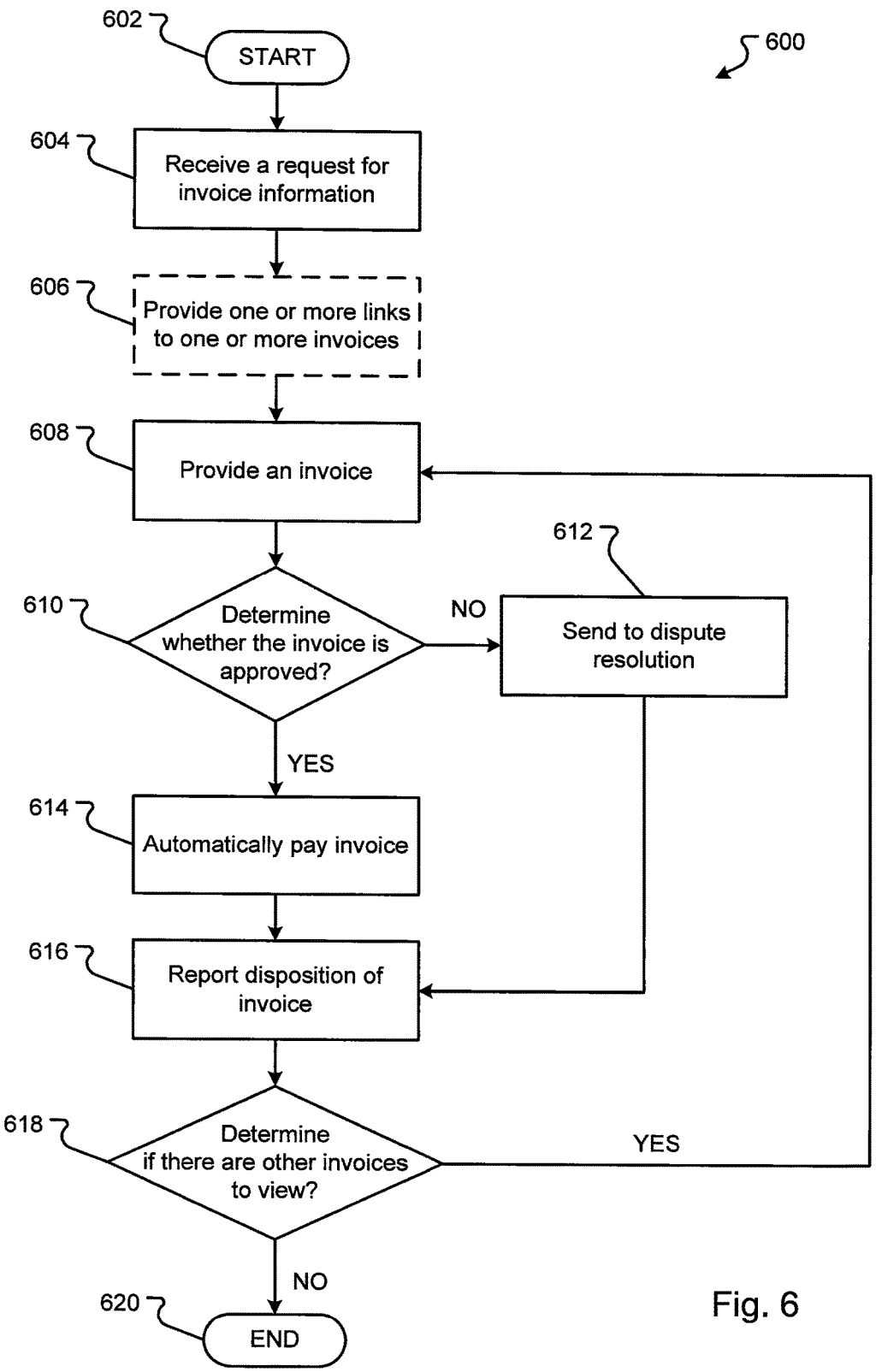
FIG. 6 is a flow diagram of an embodiment of a process for coordinating payment of the invoice with a shipper.

The central payment system 202 can parse the invoice information 300. Then, the central payment system 202 may identify each shipper identifier 304 in the invoice information 300. The parsed invoice information can then be stored by carrier identifier 302 and shipper identifier 304 pairs in step 508. Thus, the central payment system 202 can organize and store the invoice information according to the shipper identifier 304 and the carrier identifier 302. Each stored invoice may be identified by the invoice header information 306. The central payment system 202 may then provide the invoices to the shippers in step 510. An embodiment of a method 600 for providing invoices to the shippers is shown in FIG. 6.

The method 600 may represent one or more steps of a computer-executable process that is executed by a processor. In embodiments, the method 600 will be explained with reference to components and data structures described in conjunction with FIGS. 1-3C. Generally, the method 600 begins with a start operation 602 and terminates with an end operation 620. However, the steps shown in FIG. 6 may represent only a subset of steps in the method 600, and the steps shown may be preformed out of order.

The central payment system 202 can receive a request to review invoice information in step 604. The request may be received in response to an alert provided to a shipper from the central payment system 202. For example, the central payment system 202 may change the start page of the web site provided to a shipper when the shipper logs on to the central payment system 202. When the shipper logs on to the web site, the central payment system 202 can determine the identifier for the shipper and locate the identifier in the database 216. If there is a new or unread invoice associated with the shipper identifier, the central payment system 202 can send the modified start page. A new or unread invoice may be determined by comparing the save data and time of the invoice with the last log on date and time. If the save date and time of the invoice are more recent than the last log on date and time, the central payment system 202 can determine that the invoice is new or unread. The start page can include a visual indicator that a new invoice associated with the shipper has been received.

Optionally, the central payment system 202 can provide one or more links to the one or more invoices in step 606. In embodiments, the start page or other web page can include a selectable device that is a URL directed to an invoice. In other embodiments, the central payment system 202 receives a request to provide all invoice data. For example, the shipper selects a user interface device to view all invoice data. The central payment system 202 then provides one or more invoices in step 608. The central payment system 202 can send a web page showing invoice data extracted from the database 216. A shipper can review the invoice data and be provided with a user interface device to approve the invoice.

The central payment system 202 determines if an invoice is approved in step 610. In embodiments, the central payment system 202 determines if the shipper selects the user interface device to approve the invoice. If the shipper does not approve the invoice, the method 600 proceeds NO to step 612 where the invoice is sent to a dispute resolution process. The shipper may be presented with a web page to enter the reasons for the dispute which can be provided to the carrier in step 616. If the invoice is approved, the method 600 proceeds YES to step 614.

The central payment system 202 can automatically pay the invoice in step 614. An invoice system 210 of the central payment system 202 can receive the approval and forward the payment information from the invoice data 308 along with the carrier payment information 320 and shipper payment information 328 to the payment system 214. The payment system 214 may determine the type of payment to make, for example, credit, ACH transfer, debit transaction, credit from the carrier, credit provided by the central payment system 202, etc.

The preference of payment type may be determined from the carrier payment information 320 and/or shipper payment information 328. The payment system 214 generates the payment message and sends the message to the merchant acquirer 106 or other system. The results of the payment transaction, whether successful payment or unsuccessful payment, are reported back to the invoice system 210.

The central payment system 202 reports the disposition of the invoice in step 616. In an embodiment, the invoice system 210 creates a web page that can be sent by either the shipper communication interface 208 or the carrier communication interface 206. The web page includes a status of the invoice, for example, paid, approved, disputed, etc. When a shipper or carrier associated with the invoice logs on, the web page can be provided to the shipper 116 or carrier 114. The web page may be provided upon requests such as when a shipper 116 or carrier 114 select a user interface device to see the status of one or more invoices. In other embodiments, the invoice system 210 generates an email, text message, or other message that is sent by the shipper communication interface 208 or the carrier communication interface 206 directly to the shipper 116 or carrier 114.

After a first invoice is approved or disputed, a second or next invoice may be requested by the shipper 116. The central payment system 202 can determine if there is another invoice to view in step 618. In embodiments, if the shipper 116 wants to view another invoice, the shipper communication interface 208 receives a request to view another interface. For example, the shipper selects a user interface device on a web page to view all the invoices or to view a next invoice. The selection is received by the shipper communication interface 208 and sent to the invoice system 210. If a selection to view another invoice is received, the method 600 proceeds YES back to step 608. If no selection is received or a selection other than to view another invoice is received, the method 600 can proceed NO to step 620.

Figure 7:
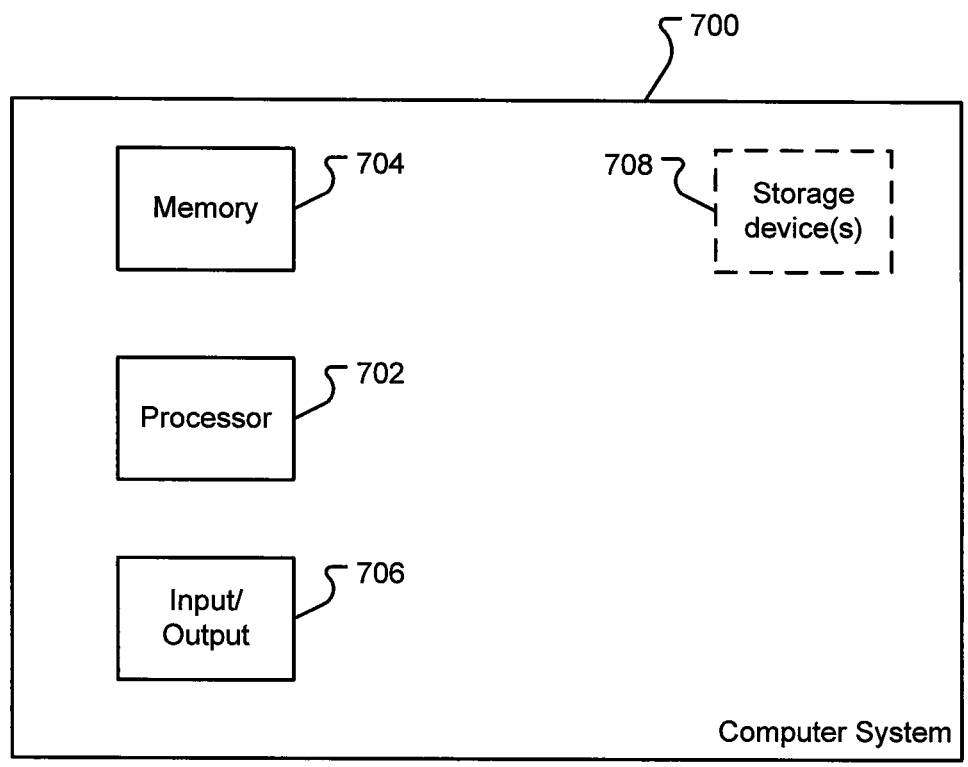
FIG. 7 is a block diagram of an embodiment of a computer system for use in the system for electronically and automatically paying for cargo shipments.

An embodiment of a computer system 700 operable to perform as one or more components or in one or more systems as described herein is shown in FIG. 7. The computer system 700 can comprise a processor 702 that can execute software elements, components, modules, computer-executable processes or steps. The software elements can be stored within the working memory 704. The software elements may include an operating system and/or other code, such as one or more application programs, which may execute the methods explained in conjunction with FIGS. 4, 5, and 6. The software elements may comprise computer programs of the disclosure and/or may be designed to implement methods of the disclosure and/or configure systems of the disclosure, as described herein.

Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 708. Storage device(s) 708 can be hard drives, ROM, RAM, or other memory comprised of any storage technology or using any memory application to store data or executable software components. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code. System 700 can also include input and output devices 706. Input devices can include cameras, microphones, keyboards, mice, etc. Output devices can include displays (e.g., LCD monitors), speakers, printers, etc.

The central payment system 202 provides advantages of the systems and methods previously used. For example, the central payment system 202 can electronically organize the payment of invoices for cargo shipments. This central payment system 202 can provide the interaction between multiple carriers and multiple shippers. Further, the central payment system 202 can automatically pay invoices approved by shippers. Thus, the central payment system 202 eliminates the need for sending payment by check, wire transfer, etc. Overall, the central payment system 202 make the payment of invoice for cargo shipments more efficient and effective.

The preceding description provides exemplary embodiment(s) only, and is not intended to limit the scope, applicability or configuration of the disclosure. Rather, the description of the exemplary embodiment(s) provide those skilled in the art with an enabling description for implementing an exemplary embodiment of the disclosure. It is to be understood that various changes may be made in the function and arrangement of elements without departing from the spirit and scope of the disclosure as set forth in the appended claims.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 8:
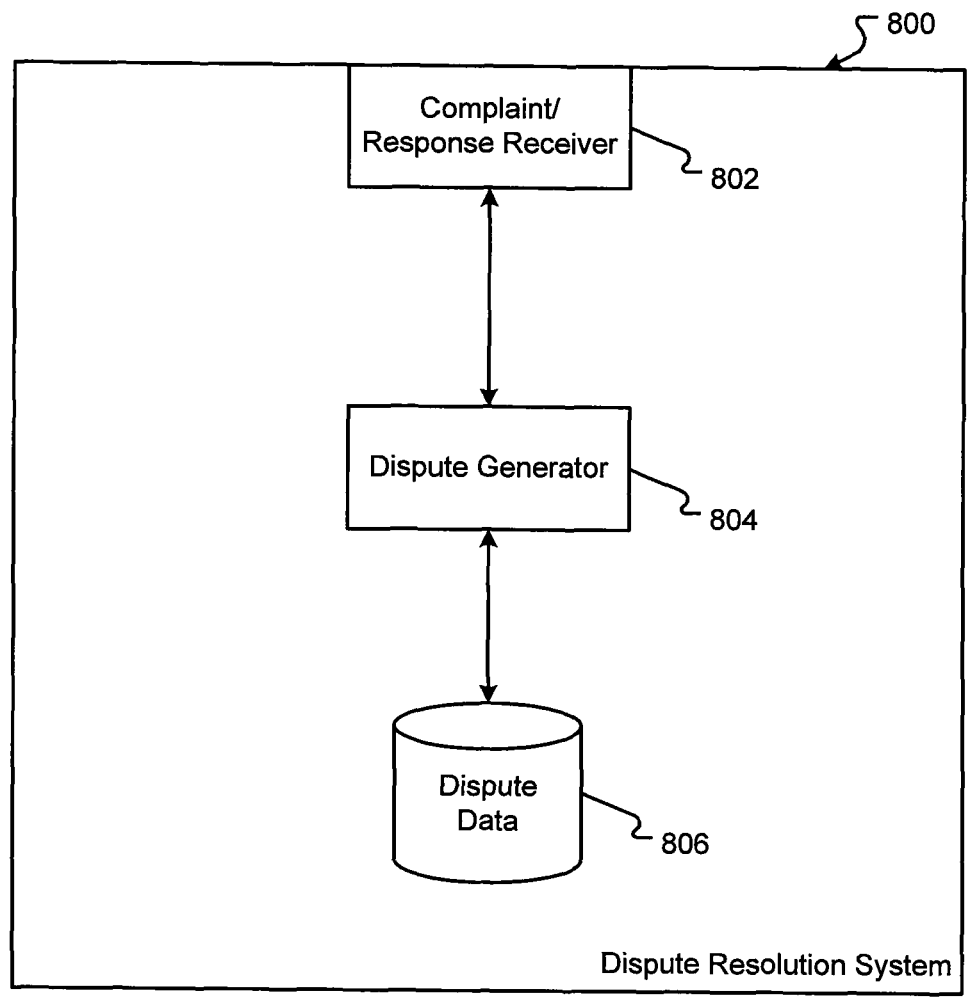
FIG. 8 is a hardware and/or software block diagram of an embodiment of dispute resolution system operable to resolve disputes in the electronic cargo pay system.

An embodiment of a dispute resolution system 800 is shown in FIG. 8. The function of the dispute resolution system 800 shall be described with reference to FIGS. 8 through 10. A dispute resolution system 800 comprises a complaint/response receiver 802 in communication with a dispute generator 804 that is in communication with a dispute data database 806.

Figure 9:
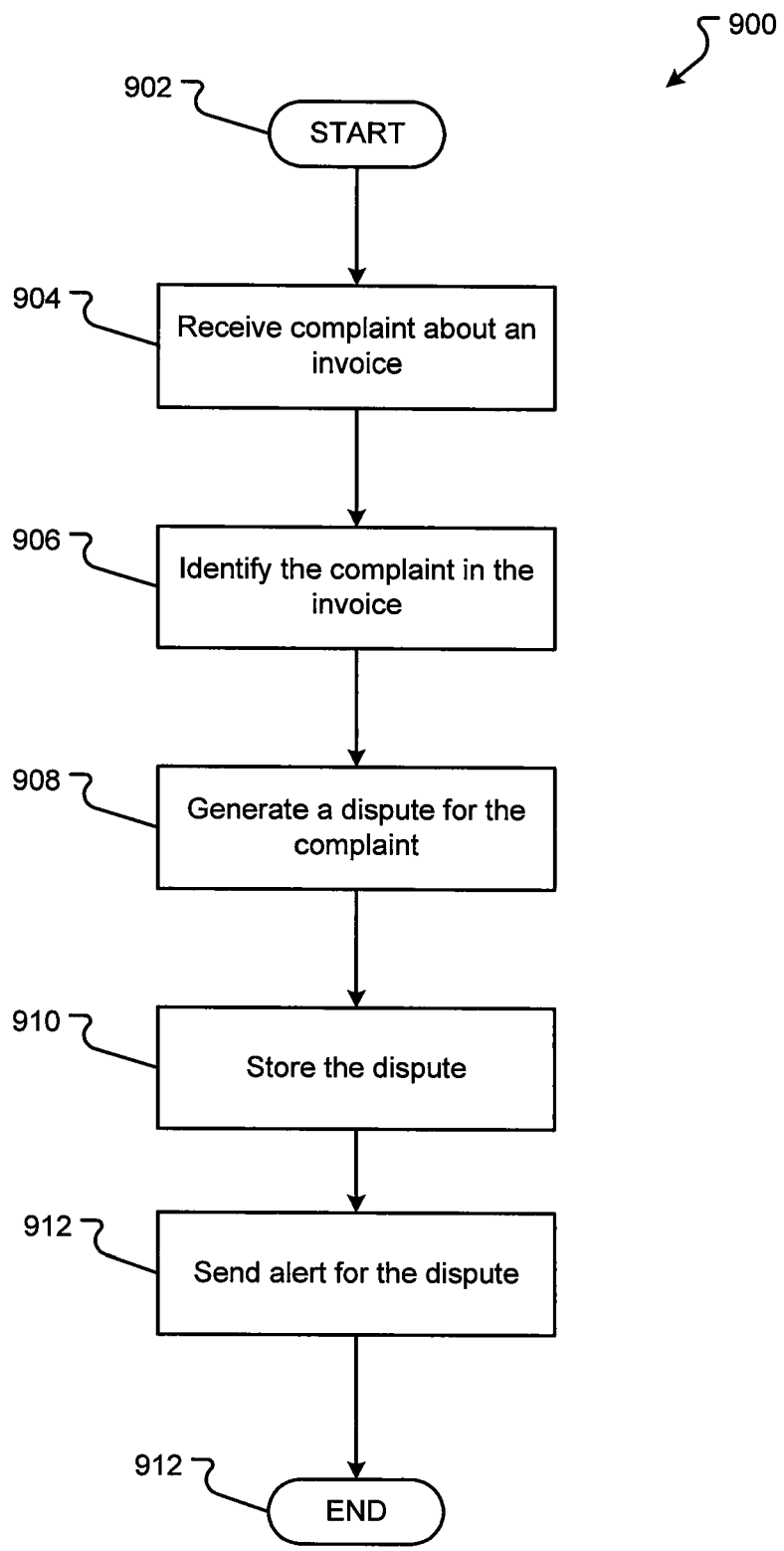
FIGS. 9 and 10 are flow diagrams of an embodiment of a process for resolving a dispute associated with an invoice in the electronic cargo pay system.
Figure 10:
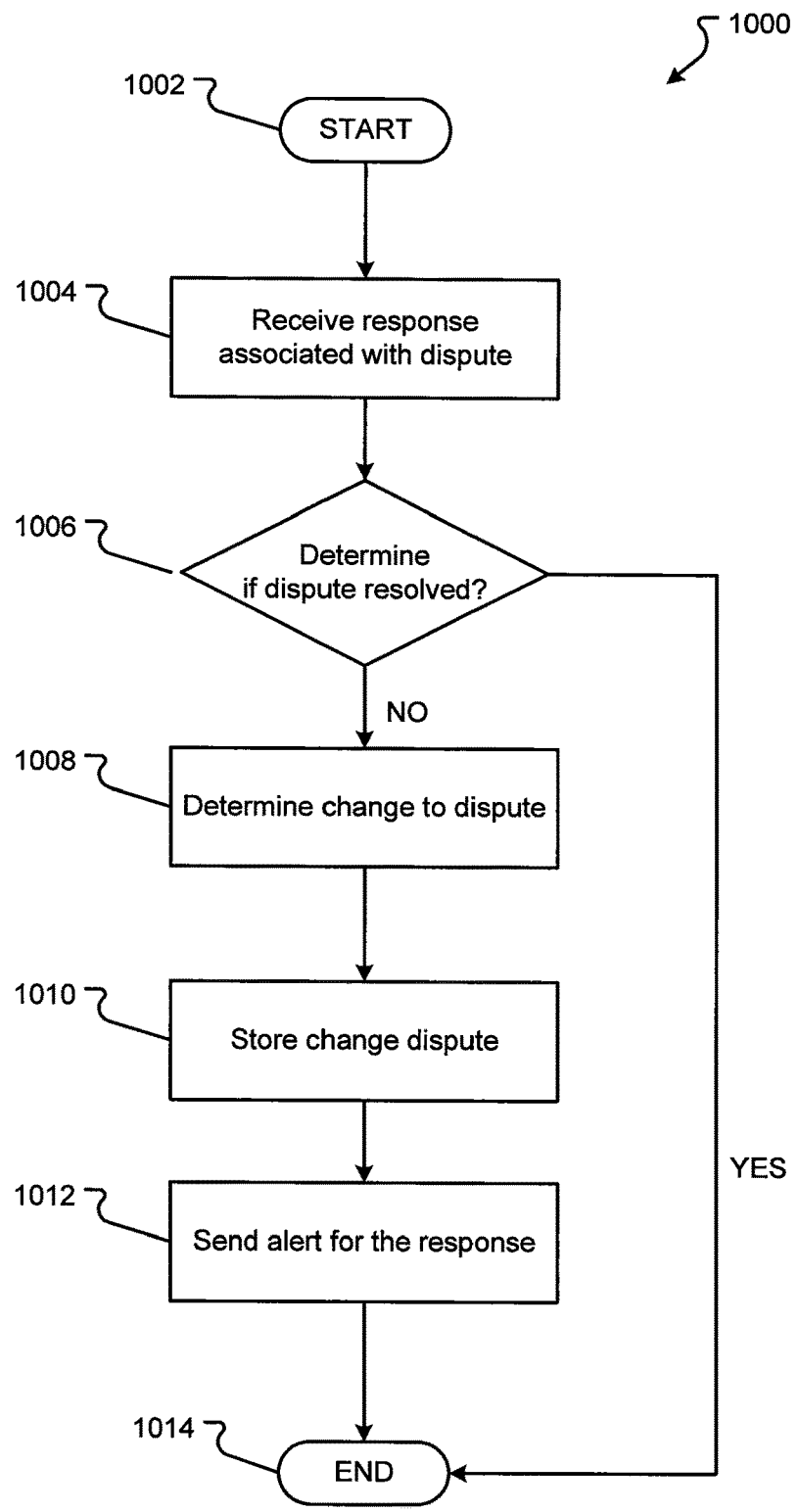

Embodiments of methods 900 and 1000 for conducting a dispute resolution in a central payment system are shown in FIGS. 9 and 10. The methods 900 and 1000 begin with a start operation 902 and 1002 and terminate with an end operation 912 and 1014. In FIG. 7, a complaint is received from the shipper in step 904. The complaint is identified in the invoice in step 906. A dispute is generated for the complaint in step 908. This dispute is stored in step 910. After a dispute is generated and stored, an alert is sent in step 912.

In FIG. 10, a response from the carrier associated with the dispute is received in step 1004. In response to receiving the response, a determination is made regarding whether the dispute is resolved in step 1006. If and when the dispute is resolved, the method 1000 flows YES to end the dispute resolution process at step 1014. When the dispute is not resolved, the method 1000 flows NO and a change to the dispute is determined in step 1008. The change to the dispute is stored in step 1010. An alert regarding the changed dispute is sent in step 1012.

Figure 11:
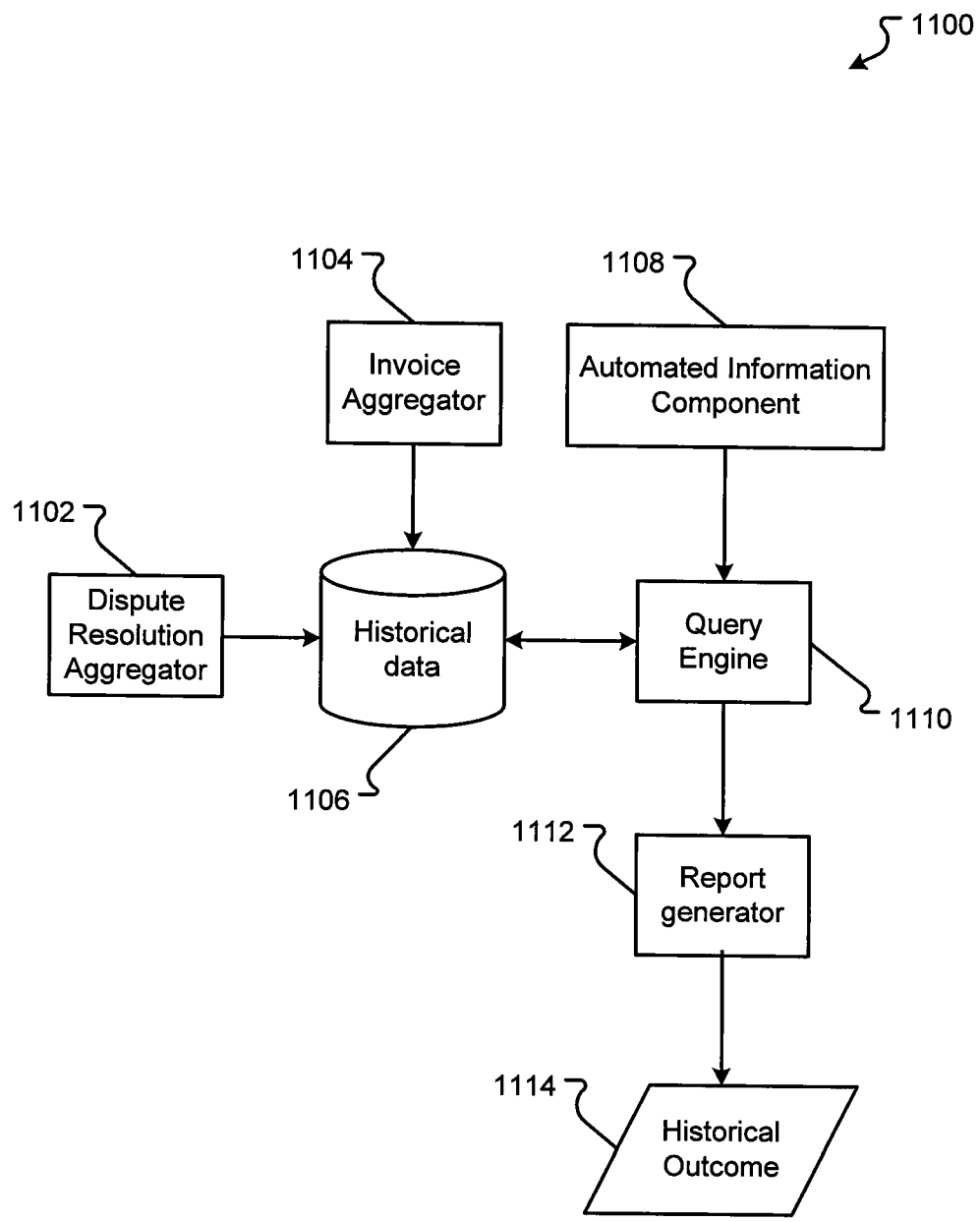
FIG. 11 is a hardware and/or software block diagram of an embodiment of historical data system operable to provide historical data about actions in the electronic cargo pay system.

An embodiment of a historical data system 1100 is shown in FIG. 11. The function of the historical data system 1100 shall be described with reference to FIGS. 11 and 12. A historical data system 1100 comprises a dispute resolution aggregator 1102 in communication with a historical data database 1106. The historical data database 1106 receives an input from an invoice aggregator 1104. The historical data database 1106 is also in two-way communication with a query engine 1110. The query engine 1110 receives input from an automated information component 1108. The query engine 1110 is in communication with a report generator 1112 that produces historical outcome data.

Figure 12:
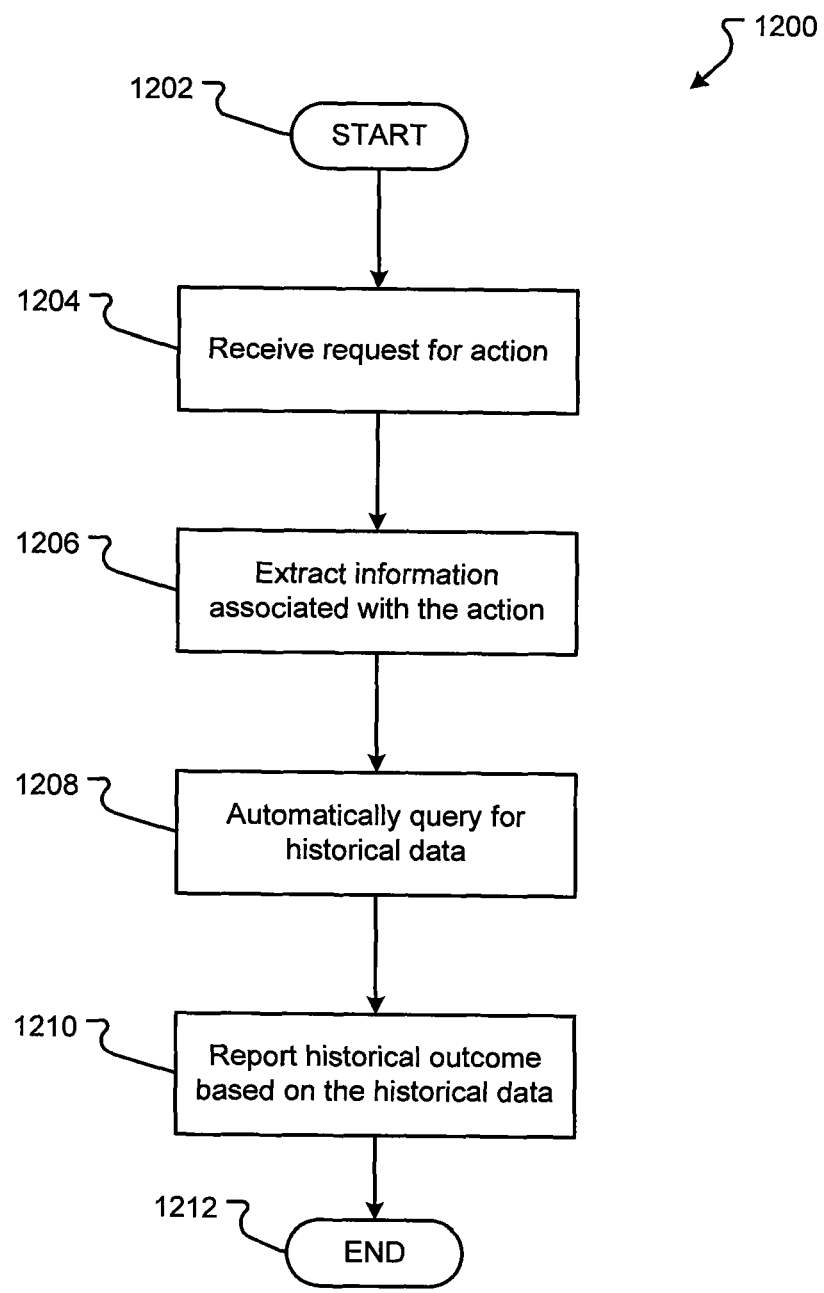
FIG. 12 is a flow diagram of an embodiment of a process for providing historical data in an electronic cargo pay system.

An embodiment of a method 1200 for receiving invoice information from a carrier is shown in FIG. 12. The method 1200 begins with a start operation 1202 and terminates with an end operation 1212. A request for action is received in step 1204. The information associated with the action is extracted in step 1206. Historical data is automatically queried in step 1208. A historical outcome, based on the historical data, is reported in step 1210.

Figure 13:
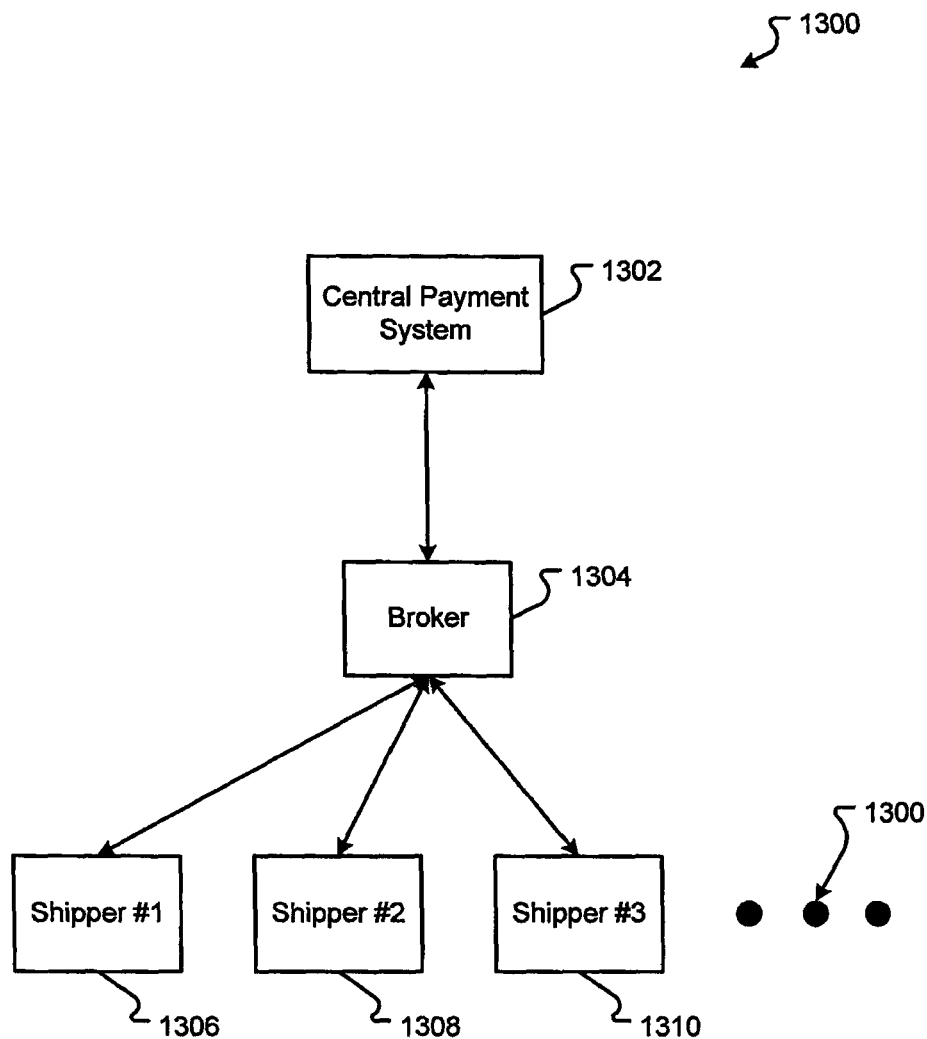
FIG. 13 is a hardware and/or software block diagram of an alternative embodiment of electronic cargo pay system operable to electronically and automatically pay for cargo shipments using a broker.

An alternative embodiment of the electronic cargo payment system 1300 is shown in FIG. 13. Herein, a broker 1304 is interposed between the central payment system 1302 and one or more shippers, e.g., shipper #1 1306, shipper #2 1308, or shipper #3 1310.

While the principles of the disclosure have been described above in connection with specific apparatuses and methods, it is to be clearly understood that this description is made only by way of example and not as limitation on the scope of the disclosure.

What is claimed is:

1. A method for automatically paying an invoice associated with a cargo shipment, the method comprising:
   a central payment system receiving a first TCP/IP packet comprising invoice information for an invoice from a carrier's accounts receivable system over a private, secured network, wherein the invoice information comprises an invoice header that includes at least one member of a list of identifying information including: an invoice number, a date of an invoice, a time of the invoice, and a name of the invoice;
   the central payment system translating the invoice information from a TCP/IP format into an extensible markup language (XML) document having standardized fields usable by the central payment system;
   the central payment system creating a shipper registration data structure upon receiving a second TCP/IP packet comprising a request from a shipper to register via the central payment system over the network, wherein the shipper registration data structure comprises at least one of: a shipper identifier field, a shipper information field, and a shipper payment field;
   the central payment system storing the shipper registration data structure in a relational database stored across an array of memory devices of the central payment system, the relational database comprising a computing system for storing and accessing data;
   the central payment system associating a first identifier with the invoice information by storing the invoice information in the shipper registration data structure in the relational database, the first identifier identifying the shipper;
   the central payment system creating a carrier registration data structure upon receiving a third TCP/IP packet comprising a request from the carrier to register, wherein the carrier registration data structure comprises at least one of: a carrier identifier field, a carrier information field, and a carrier payment field;
   the central payment system storing the carrier registration data structure in the relational database;
   the central payment system associating a second identifier with the invoice information by storing the invoice information in the carrier registration data structure, the second identifier identifying a carrier;

the central payment system parsing the invoice information to identify each shipper identifier in the invoice information, wherein parsed invoice information is organized and stored in the relational database by pairs formed by one of each of the carrier identifiers and the shipper identifiers;

the central payment system storing the invoice information with the first identifier and the second identifier in the relational database;

the central payment system receiving a fourth TCP/IP packet comprising a request from the shipper for the invoice information over the network;

the central payment system determining which shipper to notice about the invoice information based on the shipper identifier associated with the invoice information;

the central payment system electronically providing a fifth TCP/IP packet comprising the invoice information to the shipper over the network;

the central payment system receiving a sixth TCP/IP packet comprising a response from the shipper over the network;

the central payment system synchronizing accounts receivable invoice information at the accounts receivable system of the carrier with the invoice information stored by the central payment system such that any changes in either the central payment system or in the accounts receivable system are reflected in the other system, and wherein the synchronization comprises checking for invoice information that has changed since the last synchronization; and in response to receiving the response, the central payment system automatically paying the invoice.

2. The method as defined in claim 1, further comprising, in response to receiving the request from the shipper for the invoice information, the central payment system determining one or more invoices associated with the shipper.

3. The method as defined in claim 2, wherein determining one or more invoices associated with the shipper comprises:
the central payment system determining an identifier for the shipper; and
the central payment system identifying the one or more invoices stored with the identifier for the shipper.

4. The method as defined in claim 1, further comprising:
the central payment system determining if the response is an approval of the invoice information;
when the response is an approval, the central payment system automatically paying the invoice; and
when the response is a rejection of the invoice information, the central payment system sending the invoice to dispute resolution.

5. A computer-readable medium having stored thereon a set of computer-executable instructions that, when executed by a processor, cause the processor to perform a method for automatically paying an invoice associated with a cargo shipment, the instructions comprising:
instructions to receive a first TCP/IP packet comprising a first invoice from an accounts receivable system of a first carrier over a private, secured network, wherein the first invoice comprises invoice information, wherein the invoice information comprises an invoice header that includes at least one member of a list of identifying information including: an invoice number, a date of an invoice, a time of the invoice, and a name of the invoice;

instructions to translate the invoice information from a TCP/IP format into an extensible markup language (XML) document having standardized fields usable by a central payment system;

instructions to create a shipper registration data structure upon receiving a second TCP/IP packet comprising a request from a shipper to register via the central payment system over the network, wherein the shipper registration data structure comprises at least one of: a shipper identifier field, a shipper information field, and a shipper payment field;

instructions to store the shipper registration data structure in a relational database stored across an array of memory devices of the central payment system, the relational database comprising a computing system for storing and accessing data;

instructions to receive a third TCP/IP packet comprising a second invoice from a second carrier;

instructions to associate a first identifier with the invoice information of the first invoice in the relational database and with the second invoice by storing the invoice information in the shipper registration data structure in the relational database, the first identifier identifying the shipper;

instructions to create a carrier registration data structure upon receiving a fourth TCP/IP packet comprising a request from the first carrier to register, wherein the carrier registration data structure comprises at least one of: a carrier identifier field, a carrier information field, and a carrier payment field;

instructions to associate a second identifier with the invoice information of the first invoice by storing the invoice information in the carrier registration data structure, the second identifier identifying the first carrier;

instructions to associate a third identifier with the second invoice, the third identifier identifying the second carrier;

instructions to parse the invoice information to identify each shipper identifier in the invoice information, wherein parsed invoice information is organized and stored in the relational database by pairs formed by one of each of the carrier identifiers and the shipper identifiers;

instructions to store the invoice information of the first invoice with the first identifier and the second identifier at the central payment system in the relational database;

instructions to store the second invoice with the first identifier and the third identifier in the relational database;

instructions to receive a fifth TCP/IP packet comprising a request from the shipper for the invoice information over the network;

instructions to determine which shipper to notice about the invoice information based on the shipper identifier associated with the invoice information;

instructions to electronically provide a sixth TCP/IP packet comprising the invoice information of the first invoice to the shipper over the network;

instructions to receive a response from the shipper associated with the first invoice;

instructions to synchronize accounts receivable invoice information at an accounts receivable system of the carrier with the invoice information stored at the central payment system such that any changes in either the central payment system or in the accounts receivable system are reflected in the other system, and wherein the synchronization comprises checking for invoice information that has changed since the last synchronization; and in response to receiving the response, instructions to automatically pay the first invoice.

6. The computer-readable medium as defined in claim 5, further comprising:
instructions to determine if the shipper desires to view the second invoice;
when the shipper desires to see the second invoice, instructions to provide the second invoice;
instructions to receive a response associated with second invoice;
instructions to determine if the response is an approval of the second invoice;
when the response is an approval, instruction to automatically pay the invoice; and
when the response is a rejection of the invoice information; instruction to send the second invoice to dispute resolution.

7. The computer-readable medium as defined in claim 5, further comprising instructions to report the disposition of the first invoice to the shipper and carrier.

8. The computer-readable medium as defined in claim 5, further comprising:
in response to the request for invoice information, instructions to provide a first selectable URL link to the shipper on a web page for the first invoice;
in response to the request for invoice information, instructions to provide a second selectable URL link to the shipper on the web page for the second invoice; and
instructions to receive selection of the first selectable URL link.

9. The method as defined in claim 1, wherein automatically paying for the invoice comprises sending a transfer request over an automated clearing house (ACH) network to transfer an amount of an invoice from an account of the shipper to an intermediary account associated with the central payment system.

10. The method as defined in claim 1, further comprising:
in response to the request for invoice information, providing a selectable URL link to the shipper on a web page for the invoice; and
receiving selection of the selectable URL link.

11. The method as defined in claim 1, further comprising:
receiving payment information from the shipper or the carrier, wherein the payment information comprises bank account information or a routing number.

12. The computer-readable medium as defined in claim 5, wherein automatically paying for the invoice comprises sending a transfer request over an automated clearing house (ACH) network to transfer an amount of an invoice from an account of the shipper to an intermediary account associated with the central payment system.

13. The computer-readable medium as defined in claim 5, further comprising:
instructions to register the first carrier, the second carrier, and the shipper; and
instructions to create the first identifier, the second identifier, and the third identifier.

14. The computer-readable medium as defined in claim 5, further comprising instructions to receive payment information from the shipper, the first carrier, or the second carrier, wherein the payment information comprises bank account information or a routing number.

15. The computer-readable medium as defined in claim 5, further comprising instructions to associate a selected third carrier with the shipper.

16. A central payment system for automatically paying an invoice associated with a cargo shipment, the central payment system comprising:
a shipper communications interface in communication with a shipper over a private, secured network;
a carrier communications interface in communication with a carrier over the network, wherein the carrier communications interface receives a first TCP/IP packet comprising invoice information for an invoice from the carrier; and
an invoice system in communication with the shipper communications interface and the carrier communication interface, the invoice system configured to:
register the shipper and the carrier with the central payment system;
assign a first identifier to the shipper;
assign a second identifier to the carrier;
receive the first TCP/IP packet comprising the invoice information from the carrier communications interface, wherein the invoice information comprises an invoice header that includes at least one member of a list of identifying information including: an invoice number, a date of an invoice, a time of the invoice, and a name of the invoice;
translate the invoice information from a TCP/IP format into an extensible markup language (XML) document having standardized fields usable by the central payment system;
create a shipper registration data structure upon receiving a second TCP/IP packet comprising a request from a shipper to register via the central payment system over the network, wherein the shipper registration data structure comprises at least one of: a shipper identifier field, a shipper information field, and a shipper payment field;
store the shipper registration data structure in a relational database stored across an array of memory devices of the central payment system, the relational database comprising a computing system for storing and accessing data;
create a carrier registration data structure upon receiving a third TCP/IP packet comprising a request from the carrier to register, wherein the carrier registration data structure comprises at least one of: a carrier identifier field, a carrier information field, and a carrier payment field;
associate the first identifier and the second identifier with the invoice information by storing the invoice information in the shipper registration data structure in the relational database and by storing the invoice information in the carrier registration data structure in the relational database;
parse the invoice information to identify each shipper identifier in the invoice information, wherein parsed invoice information is organized and stored in the relational database by pairs formed by one of each of the carrier identifiers and the shipper identifiers;
store the invoice information in the relational database;
determine which shipper to notice about the invoice information based on the shipper identifier associated with the invoice information;
electronically notify a shipper of the invoice information through the shipper communications interface over the network;

receive approval of the invoice information from the shipper through the shipper communications interface over the network;

synchronize carrier invoice information of the carrier with the invoice information stored at the invoice system such that any changes in either the invoice system or in an accounts receivable system are reflected in the other system, and wherein the synchronization comprises checking for invoice information that has changed since the last synchronization; and automatically pay for the approved invoice.

17. The central payment system as defined in claim 16, wherein the invoice system is further configured to receive payment information from the shipper via the shipper communications interface or from the carrier via the carrier communications interface, wherein the payment information comprises bank account information or a routing number.

18. The central payment system as defined in claim 16, wherein the carrier comprises a first carrier and the invoice system is further configured to associate a selected second carrier with the shipper.

19. The central payment system as defined in claim 16, wherein the invoice information is stored using both the first identifier and the second identifier.

20. The central payment system as defined in claim 16, wherein automatically paying for the approved invoice comprises sending a transfer request over an automated clearing house (ACH) network to transfer an amount of the invoice from an account of the shipper to an intermediary account associated with the central payment system.

21. The central payment system as defined in claim 17, wherein the invoice system is configured to:

transmit the payment information to a merchant acquirer;

receive an authorization for a payment of the invoice from the merchant acquirer; and forwarding the authorization to the shipper or the carrier.

* * * * *